United States Patent [19]

Friebel

[11] Patent Number: 4,828,204
[45] Date of Patent: May 9, 1989

[54] SUPERSONIC AIRPLANE

[75] Inventor: Gottfried O. Friebel, Bellevue, Wash.

[73] Assignee: The Boeing Company, Seattle, Wash.

[21] Appl. No.: 477,289

[22] Filed: Mar. 21, 1983

Related U.S. Application Data

[63] Continuation-in-part of Ser. No. 66,160, Aug. 13, 1979, Pat. No. Des. 269,176.

[51] Int. Cl.[4] .......................... B64C 23/00; B64C 3/10
[52] U.S. Cl. .................................. 244/15; 244/45 R; 244/91; 244/117 R
[58] Field of Search .............. 244/45 R, 47, 4 R, 12.1, 244/13, 23 R, 35 R, 54, 117 R, 130, 15, 91; D12/319, 341

[56] References Cited

U.S. PATENT DOCUMENTS

| | | | |
|---|---|---|---|
| 2,649,265 | 8/1953 | Grant | 244/91 |
| 2,960,285 | 11/1960 | Lopez | 244/90 R |
| 3,310,262 | 3/1967 | Robins et al. | 244/45 R |
| 3,430,446 | 3/1969 | McCloy | 244/15 |
| 3,463,108 | 8/1969 | Neumeier | 244/47 |

OTHER PUBLICATIONS

Popular Science Magazine, Jul. 1979, p. 64.

*Primary Examiner*—Galen Barefoot
*Attorney, Agent, or Firm*—H. Gus Hartman; B. A. Donahue

[57] ABSTRACT

A twin-engine supersonic airplane having an arrow-shaped wing and an elongated fuselage extending approximately equally forward and rearward of the wing. The fuselage is configured for six passengers in a staggered two-abreast seating arrangement and for two pilots seated in tandem. A forebody section of the fuselage, which extends substantially forward of the wing, is of a specific geometric cross-sectional design, i.e., it is an egg-shaped cross section with opposite sidewalls sloping vertically inward in an upward direction. The sidewalls are only of a single curvature in a fore-and-aft direction, and this substantially flat surface has windows installed therein which have an optically flat surface in order that a minimum of visual distortion is produced due to thermal expansion during supersonic flight. Twin vertical stabilizers are spaced apart and each is mounted near a wing tip; and the stabilizers extend both vertically above and below the wing chord plane for functioning as wing tip end plates. Outboard of the vertical stabilizers is an auxiliary wing in coplanar alignment with the main wing and rotatably movable as a unit for lateral roll control and/or longitudinal pitch control of the airplane. The twin engines are spaced apart on either side of the fuselage, between the fuselage and the vertical stabilizers, and mounted to the undersurface of the wing.

7 Claims, 4 Drawing Sheets

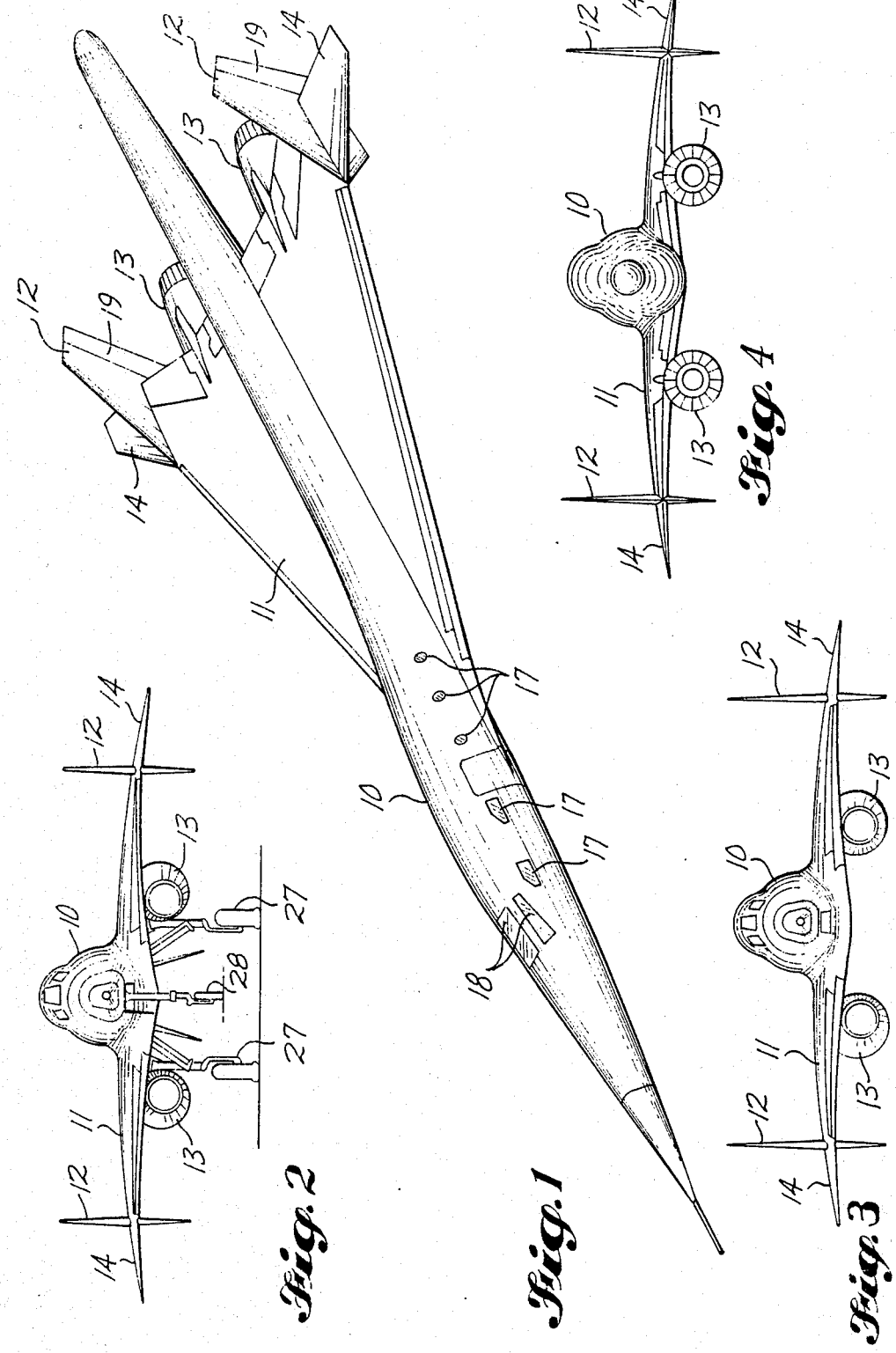

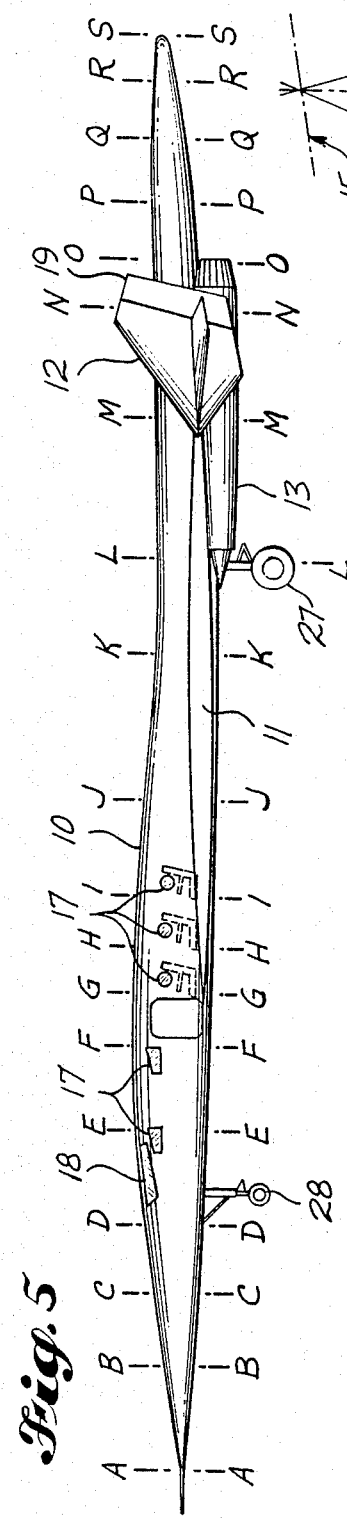

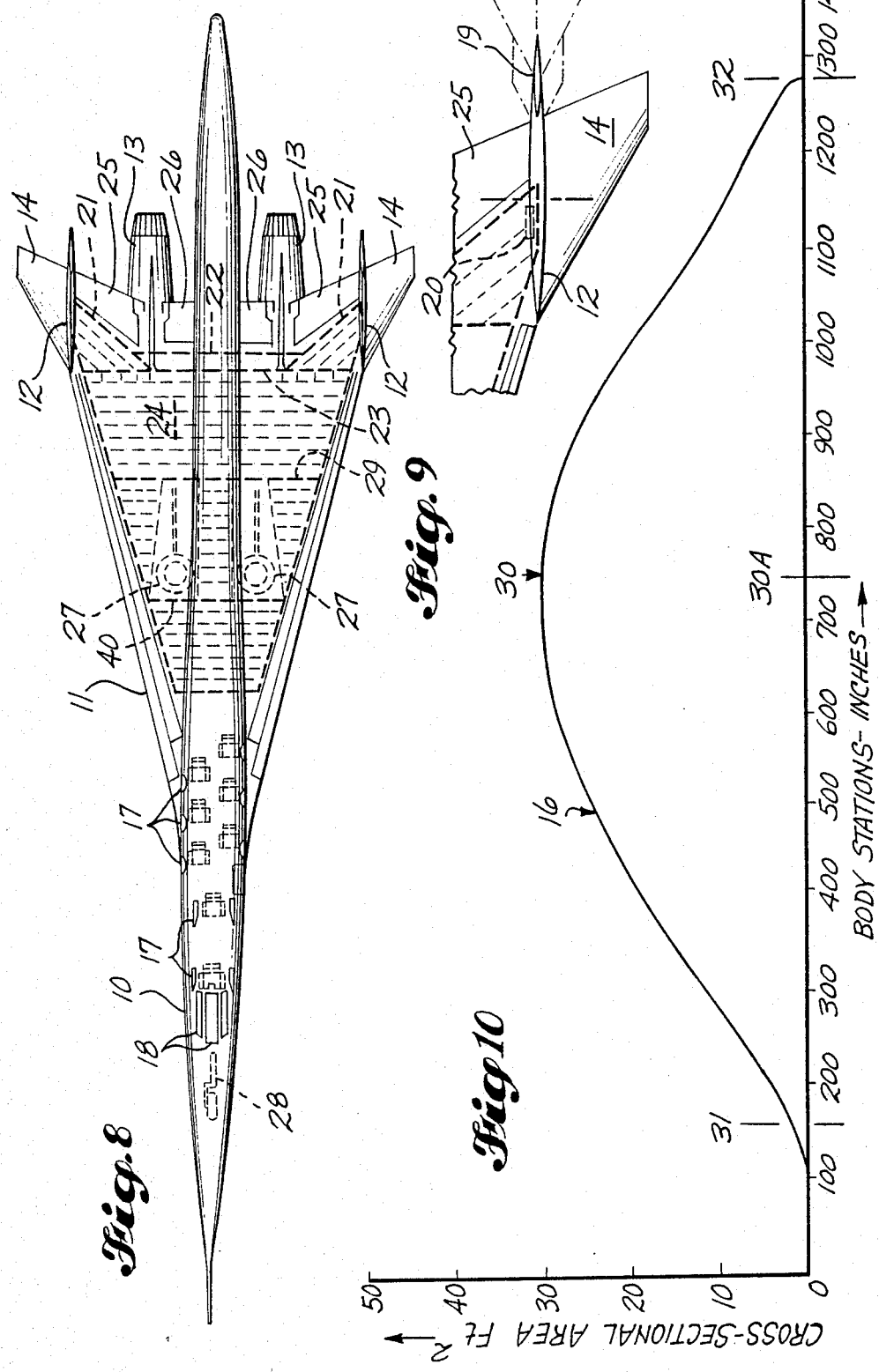

SUPERSONIC AIRPLANE

CROSS-REFERENCES TO RELATED APPLICATIONS

This patent application is a continuation-in-part of design Patent Application Ser. No. 066,160, filed Aug. 13, 1979, now U.S. Pat. No. Des. 269,176.

SUMMARY OF THE INVENTION

The present invention relates to a high-speed airplane having a fuselage and wing combination that is specifically designed for sustained supersonic cruise flight at approximately Mach number 2.5. The airplane can also be efficiently flown at high subsonic speed and has good slow subsonic speed flight characteristics for landing and takeoff operations.

The present airplane configuration comprises: an arrow-shaped win planform; an elongated fuselage that extends approximately an equal distance fore and aft of the wing; a pair of transversely spaced apart vertical stabilizers of a delta-shaped planform; and a pair of turbo-jet engines spaced apart and pylon mounted from the undersurface of the wing, outboard of the fuselage and inboard of the vertical stabilizer.

The difference between an arrow-shaped planform and a delta-shaped planform is the angle of sweepback of the leading edge; and if the angle is more than 65° (sixty-five degrees), it is generally classified as an arrow shape.

The present configuration does not have a conventional horizontal stabilizer. A wing tip-like airfoil section, outboard of the vertical stabilizers, functions as a horizontal stabilizer when moved in concert or collectively and functions as ailerons when moved differentially.

Where the arrow shaped wing and the elongated fuselage join, there is a change in fuselage cross section, i.e., the airplane is area-ruled so that the juncture of the two cross-sectional areas (fuselage and wing) do not form an abrupt or sudden area accumulation, but rather a symmetrical blending. Therefore, this wing-to-fuselage juncture or mid-fuselage section is definitely contoured, i.e., it has what is termed a "waisted-in" body design which is due to the area ruling of the fuselage and wing cross-sectional areas.

The arrow-shaped wing planform combines the qualities of: a minimum aerodynamic wave drag which is produced by both the acute angle of sweepback of the wing leading edge and the low aspect ratio of the arrowshaped planform; and, a minimum of aerodynamic profile drag resulting from both the area-rule streamlining of the fuselage which extends approximately equally fore and aft of the wing, and an -unusual egg-shaped, cross-sectional design of the fuselage forebody section that provides adequate passenger seating comfort with a minimum of cross-sectional area.

An object of the invention is to produce a supersonic airplane design having an arrow-shaped wing planform which is integrated with an elongated, streamlined fuselage of a specific geometric cross-sectional design; whereby, the best aerodynamic efficiency, i.e., the highest lift/drag ratio, is produced during cruise flight at a Mach number of approximately 2.5.

Another object is to produce a supersonic airliner having a long, slender fuselage of adequate internal volume for passengers, crew, fuel, and equipment; wherein, the cabin interior is planned around six passengers in a staggered two-abreast seating arrangement and two pilots in a tandem seating arrangement; and while providing adequate space for passengers and pilots with a minimum frontal area for low aerodynamic drag.

An advantage of sizing the airplane to six passengers and two pilots is that it significantly contributes to the flexibility of configuring the airplane to a military fighter, an interceptor, a reconnaissance aircraft, etc.

Another object is to position the dual power plants, having a preferred externally contoured nacelle, relative to an arrow-shaped wing such that the combination produces an efficient nacelle/wing interference installation; whereby, aerodynamic drag is reduced and a forward thrust component is produced by a nacelle/wing expansion shock wave phenomenon.

These and other objects, advantages, and features of the invention will become apparent from the following description taken in view of the accompanying drawings.

BRIEF DESCRIPTION OF THE DRAWINGS

FIG. 1 is a general perspective view of an embodiment of an improved supersonic airplane designed in accordance with the invention.

FIG. 2 is a front elevational view of the same airplane with the landing gear extended.

FIG. 3 is a front elevational view of the same airplane with the landing gear retracted.

FIG. 4 is a rear elevational view of the same airplane.

FIG. 5 is a side elevational view of the same airplane.

FIG. 6 shows a series of body cross sections taken at corresponding stations indicated along the fuselage; further, a method for designing the fuselage forebody sections is also illustrated.

FIG. 7 is an enlarged detail of one of the body cross sections depicted in FIG. 6.

FIG. 8 is a top plan view of the same airplane.

FIG. 9 is an enlarged detail of the left wing tip section depicted in FIG. 8.

FIG. 10 is a graph of the airplane's cross-sectional area versus the body station, longitudinally, and also illustrates the blending of the fuselage, wing, etc., comprising the supersonic airplane, in conformance with an area-rule concept.

DESCRIPTION OF THE PREFERRED EMBODIMENTS

Figure 11:
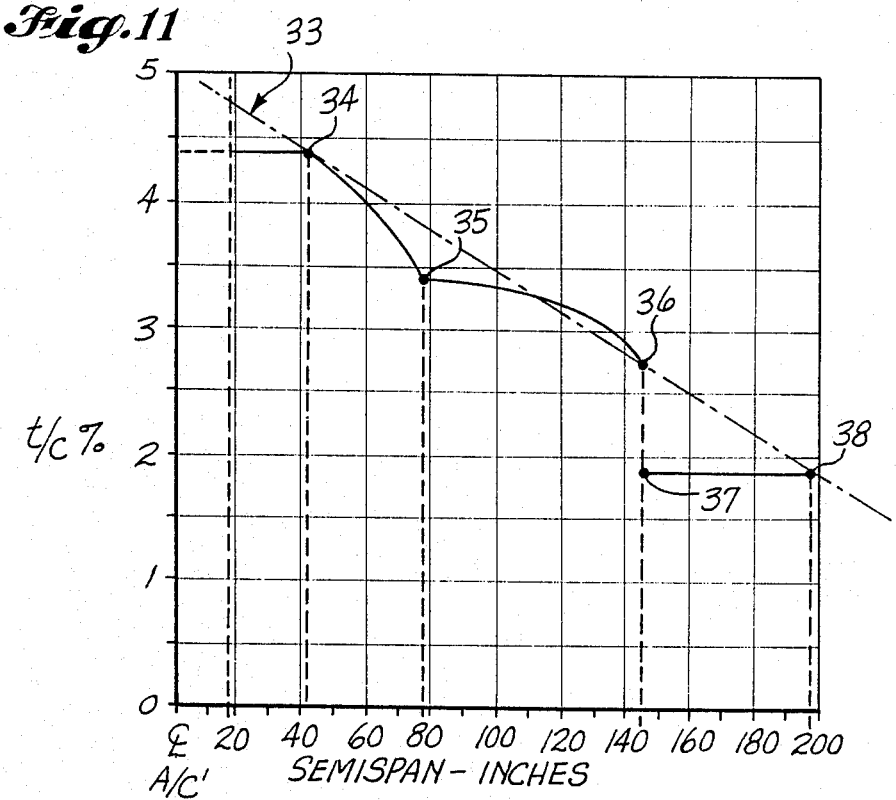
FIG. 11 is a graph of the wing thickness to chord in a percentage versus wing semi-span.

Referring to the drawings, FIGS. 1-5, 8, there is shown a twin-engine, supersonic airplane having an elongated fuselage 10; an arrow-shaped wing 11; a pair of transversely spaced apart vertical fins 12 mounted outboard on the wing 11; and a pair of pylon-mounted engine nacelles 13, each housing a turbo-jet engine, the engine nacelles 13 being spaced transversely apart on either side of the fuselage 10 and mounted from the undersurface of the wing 11.

With respect to the arrow-shaped wing planform, as shown in FIG. 8, a major length of the wing leading edge, from the fuselage 10 outboard to the vertical fins 12, has approximately a 75° angle of sweepback; and outboard of the vertical fins 12 are movable wing tiplike control surfaces 14 which have approximately a 60° angle of sweepback.

With respect to the trailing edge of the arrow-shaped wing planform: between the engine nacelles 13 and the fuselage 10, the wing trailing edge is at an angle normal to the fuselage centerline; and from the engine nacelles 13 outboard to, and including, the wing tip control surfaces 14, the angle of sweepback is approximately 25°.

The fuselage 10 comprises: a forebody section generally forward of the wing; a center-body section structurally integrated with the wing and with no fuselage protrusion evident from the undersurface of the wing; and an aft-body section that extends a substantial distance aft of the wing trailing edge, to a length approximately equal to that of the forebody section.

FIG. 6 shows a series of fuselage cross sections taken along the fuselage at the stations indicated, AA through SS in FIG. 5. FIG. 6 further depicts a method for geometrically designing the forebody section of the airplane fuselage wherein a curved loft line or common apex line 15 is utilized and from which downward projections are made for contouring the cross section of the fuselage.

The forebody cross sections, BB through II, appear egg-shaped and this provides a maximum cross-sectional area for passenger seating comfort with a minimum total cross-sectional fuselage area, because a seated passenger is generally wider across the buttocks and narrower across the head and shoulder region. Therefore, the fuselage cross section is contoured to this egg shape, as opposed to a circular shape, in order to produce the maximum comfort for the passengers with the minimum total cross-sectional area. Further, from an aerodynamic viewpoint, this egg-shaped cross section design produces surface configuration lines that present a minimal frontal area to freestream airflow and, thereby, provides a significant drag reduction, in comparison to present known supersonic transports.

With respect to the geometric design of the forebody section: initially, the total cross-sectional area at each of the depicted body stations is derived from the area-ruled graph shown in FIG. 10; and the area for the seated passengers determine one of the cross-sectional area minimums that are required to be enclosed by the area-rule envelope, shown in FIG. 10, which will be more fully described supra.

The overall shape of the fuselage forebody is derived from the following: the streamwise airflow pattern at the design supersonic cruise flight speed of Mach 2.5; the displacement volume of aircraft structure, components, and payload; and the smooth curvilinear plot line or the cross-sectional area-rule plot line 16 shown in FIG. 10.

In general, the geometric elements for design of the egg-shaped cross section of the forebody, referring to FIG. 7 which depicts the cross section at station EE enlarged, comprises four radii and a pair of flats for the sides, i.e.: a first pair of equal radii P1 form the top or upper surface curvature; a second radius R2, having its center on the common apex line 15, forms the bottom or undersurface curvature; a third pair of equal radii R3 form the bottom-side surface curvature; and a pair of downward projecting lines on an equal and opposite slope from the common apex line 15 form the flat sides of the fuselage.

An important aspect of the invention is that the downward projecting lines of equal and opposite slope from the vertical, form the flat contoured sidewalls which are undistorted from the standpoint of curvature in a vertical sense. However, in a horizontal sense or longitudinal direction, the sidewalls have a very slight curvature. Therefore, the fuselage sidewalls are only of a single curvature and this produces minimum aerodynamic drag characteristics, because the freestream airflow at a supersonic cruise speed of Mach 2.5 is accelerated in only on direction, i.e., in an inboard/outboard direction and not also in an upward/downward direction which would result from a double curvature of the generally known type fuselage.

The side windows 17 of the fuselage 10 are located within the flat sidewall area in order that there is a minimum of visual distortion due to thermal expansion in supersonic flight.

During supersonic flight, and especially around Mach 2.5, there is an enormous pressure acting on the front cockpit windows 18, and the side cockpit and passenger windows 17; and in addition, there are very high temperatures created due to frictional forces. Therefore, conventional curved windows should not be used due to high stress and thermal expansion which would produce visual distortioning the curved-type windows. When a curved window contracts or expands, it changes curvature and produces visual distortion, whereas, a flat window can contract or expand into the molding without producing visual distortion. Further, the front cockpit windows 18 of the present Mach 2.5 airplane are approximately four inches thick, and if they were curved and distorted due to thermal expansion and pressure, it would be like looking through a varying lens.

The mid-section of the fuselage or the section along the body/wing juncture is more of a circular-shaped cross section, as shown in FIG. 6, sections JJ-LL; however, the circular aspect of the fuselage's lower portion is not evident due to its integration into the wing area.

In the aft-body section or the section aft of the body/wing juncture, beyond th trailing edge of the wing, the cross section is a clearly defined circular shape, as shown in FIG. 6, sections NN-RR. Further, it should be noted that there is a substantial extension of the fuselage aft of the wing trailing edge. Referring to FIG. 10, the total cross-sectional area of the aft-body section is determined from the area-rule graph and as shown by the slope of the area-rule line 16, the aft-body section not only provides the remaining enclosed area depicted on the graph, but it also produces a beneficial aerodynamic effect with respect to decreasing boat-tail drag.

With respect to airplane control surfaces, dual vertical stabilizers 12 are located outboard on the wing 11 and are of delta-shape in side planform having a rudder surface 19 which operates both above and below the wing chord plane. An advantage of positioning the vertical stabilizers 12 substantially outboard of the fuselage centerline is that, as the angle of attack of the wing 11 is increased, the vortices which are shed from the forebody section will no longer normally join with those from the wing 11, but they will continue substantially straight back; and if a fuselage centerline-mounted vertical stabilizer were used, these forebody-shed vortices could impinge thereon and cause directional control problems.

Control movement of the rudders 19, as shown in FIG. 9, is produced by actuators 20. The reaction control loads from the actuators 20 are taken up by the auxiliary wing structural box spar 21 cantilever supported from the rear spar 23 of the wing box 24, as opposed to the generally known mounting method wherein the stationary portion of the vertical stabilizer 12 is used for absorbing the reaction forces. By taking the reaction loads through structural wing spars, as opposed to the fixed vertical stabilizer 12, there is a minimum of aerodynamic disturbance effected by control movement of the rudders 19, i.e., if the fixed vertical stabilizer 12 is utilized for the reaction control forces, it would tend to twist and distort or the surface of the vertical fin would deflect, causing aerodynamic induced control disturbances.

The dual vertical stabilizers 12 also function as end plates, thereby creating the aerodynamic effect of two wings. This permits the auxiliary wing or wing tip control surface 14 outboard of the vertical stabilizers 12 to be actuated through various angles of incidence without substantially affecting the aerodynamic lift characteristics of the main wing section inboard thereof. Further, the wing tip control surfaces 14 are made to function both as a horizontal stabilizer and/or aileron and are termed "elevons".

The wing tip control surfaces 14, during subsonic flight, provide both roll control and pitch control; however, in supersonic flight they are locked out in order to increase the lift-to-drag ratio. The airplane is then controlled by wing trailing edge control surfaces 25 which are located between the vertical fins 12 and the engine nacelles 13, and these control surfaces 25 provide both roll control and pitch control i.e., they function as "elevons" to provide maneuverability at high speed. There are two additional wing trailing edge control surfaces 26, which are located outboard of the fuselage 10 and inboard of the engine nacelles 13, and these control surfaces 26 function as wing flaps.

In slow subsonic flight, such as during takeoff or landing operations, where the use of the wing trailing edge flaps 26 are required, the wing trailing edge control surfaces 25 are also deployed as flaps, and in order to trim out the aerodynamic down load from these deployed flaps 25, 26, the wing tip control surfaces 14 are utilized.

With respect to the engine nacelles 13, their external shape, in a fore-to-aft direction, is a conically divergent front section which is mated to a conically convergent rear section, and the rear section terminates in a variable exhaust nozzle for a turbo-jet engine. The positioning of the engine nacelles 13 relative to the wing 11 is such that, at supersonic cruise flight speeds of approximately Mach 2.5, a shock wave from the engine nacelles acts on the receding undersurface portion of the wing airfoil to produce a forward thrust component. In general, the positioning of the conically divergent front section of the engine nacelles 13 below the wing undersurface creates a pressure rise around them, and this results in a slight increase in wing lift for no increase in drag. Further, an expansion shock wave emanates from the wing leading edge and impinges on the conically convergent rear section of the engine nacelles to also produce a forward thrust component. This wing-to-nacelle arrangement, coupled with the specific nacelle contouring, produces a very favorable interference installation from an aerodynamic drag standpoint.

Further, locating the engine nacelles 13 a certain distance outboard of the fuselage 10, rather than adjacent thereto or on the centerline thereof, avoids a deep boundary layer region that builds up along the surface of the fuselage.

Also, it is beneficial for wing bending moments to have the engine weight a certain distance outboard from the longitudinal centerline of the fuselage; and a slight increase in rolling inertia is beneficial for lateral stability.

With respect to the landing gear, as shown in FIGS. 2, 5, and 8, both the main landing gear 27 and the nose landing gear 28 retract forwardly. The main landing gear 27 is mounted from the front spar 29 of the wing box 24 which is considered as the main structural area of the wing 11; the main landing gear 27 retracts forwardly away from the structural wing box 24 into an area of the wing 11 where the structural loads are minimum, or essentially a non-structural area of the wing 11. A major portion of the wing bending loads are taken up by the wing box 24; however, due to the extensive wing chord length adjacent to the fuselage 10 and the multispar construction of the wing 11, the airloads are more evenly distributed throughout the length of the fuselage, i.e., there is a mutual distribution of the wing/body bending loads over a fairly large area, as evidenced by the wing root chord length adjacent to the fuselage 10. For stowing the main landing gear 27 very little reinforcement is required; because, where the spanwise wing structure is interrupted for accommodating the main landing gear 27 cut-out volume, both the airloads and the bending moments are relatively small in comparison to those imposed on the wing box 24. The multispar wing comprises straight taper spars; and the straight-through wing box structure 24 bears the major portion of the aerodynamic loads, including the nacelle-mounted power plant and main undercarriage landing loads. Further, the long root chord wing mounted low on the long slender fuselage 10, i.e., the fuselage/wing structural juncture, substantially contributes to the longitudinal stiffness characteristics of the airplane.

In FIG. 10, which is a graph of the area-ruled airplane, the overall length of the airplane is indicated on the base line of the graph or along the x-axis, and the cross-sectional area of the airplane is indicated by the height of the curvilinear line 16 above the base line as measured along the vertical or y-axis. The maximum height point 30 of the curvilinear area line 16 is not quite in the center of the overall base line length approximately indicated at 30A between fore-and-aft equal cross section area stations 31 and 32 respectively, but is slightly aft thereof. Further, the change in slope of the curvilinear line 16 from the maximum height point 30 is at a greater rate in a rearward direction that in a forward direction. The supersonic wave drag of the airplane would be less if the change in slope of the curvilinear line from a maximum height point would be at a lesser rate in a rearward direction; however, this lesser slope would create a greater airplane volume aft of the maximum height point resulting in an increase in the wetted area and an increase in the amount of skin friction drag.

The area under the curvilinear line 16, on either side of the maximum height point 30, is generally designed to be symmetrical; however, through wind tunnel tests, it has been found that in order to balance the skin friction drag with the supersonic wave drag, the resulting overall contour of the line 16 should be as depicted in FIG. 10, wherein the base line distance from the maximum height point 30 is shorter in the aft direction (30A to 32) relative to the forward direction (30A to 31) or, stated in a more accurate manner, the volume encompassed by the curvilinear line 16 is less aft of the maximum height point 30 than it is forward thereof.

If the volume under the curvilinear line 16, aft of the maximum height point 30, were greater and the base line distance, between stations 30A and 32, were longer than as depicted in FIG. 10, there would be an increase in skin friction drag, but there would be a decrease in supersonic wave drag. Whereas, if the volume under the curvilinear line 16, aft of the maximum height point 30, were less and the base line distance were shorter than as depicted in FIG. 10, there would be a decrease in skin friction drag, but there would be an increase in supersonic wave drag due to the increased slope of line 16. Therefore, as depicted in FIG. 10, the two drag forces are balanced out.

FIGS. 2 to 4 are front and rear elevational views of the airplane and show the wing chord plane as having a downward curvature or anhedral. For a high-speed airplane, especially one that is designed for a cruise flight speed of Mach 2.5, an anhedral wing functions to stabilize the airplane, whereas a dihedral wing would tend to destabilize the airplane at supersonic speeds.

FIG. 11 is a graph of airfoil thickness-to-chord ratio distribution over the semi-span of the wing 11. The t/c % (thickness/chord ratio in percent) change from adjacent the fuselage 10 or wing root to the centerline of the engine nacelle 13 is at a fairly rapid rate as indicated by the relatively steep slope of line segment from points 34 to 35; and from the engine nacelle 13 to the vertical stabilizer 12, the slope of line segment from points 35 to 36 is of a lesser slope. The apparent kink at point 35 or the maximum deviation from the constant slope dash-dot-dot line 33 generally produces a wing crease line; however, due to the location of the engine nacelle 13 at point 35, the wing crease line is not evident and the upper surface of the wing 11 appears as one smooth and continuous contoured surface.

The wing 11 structurally comprises: a straight tapered forward spar 40; and two straight tapered main spars 29, 23, which form a structural wing box 24. The straight tapered spars in combination with the change in wing planform shape as shown in FIG. 8 result in producing the wing thickness/chord variations spanwise as shown in FIG. 11.

The wing 11 aerodynamically comprises one given family of airfoil sections with thickness/chord ratio changes spanwise, from a maximum of 4.4% adjacent the fuselage 10 to 2.75% at the vertical stabilizers 12, and approximately 1.8% constant thickness for the movable wing tip control surface 14.

Figure 12:
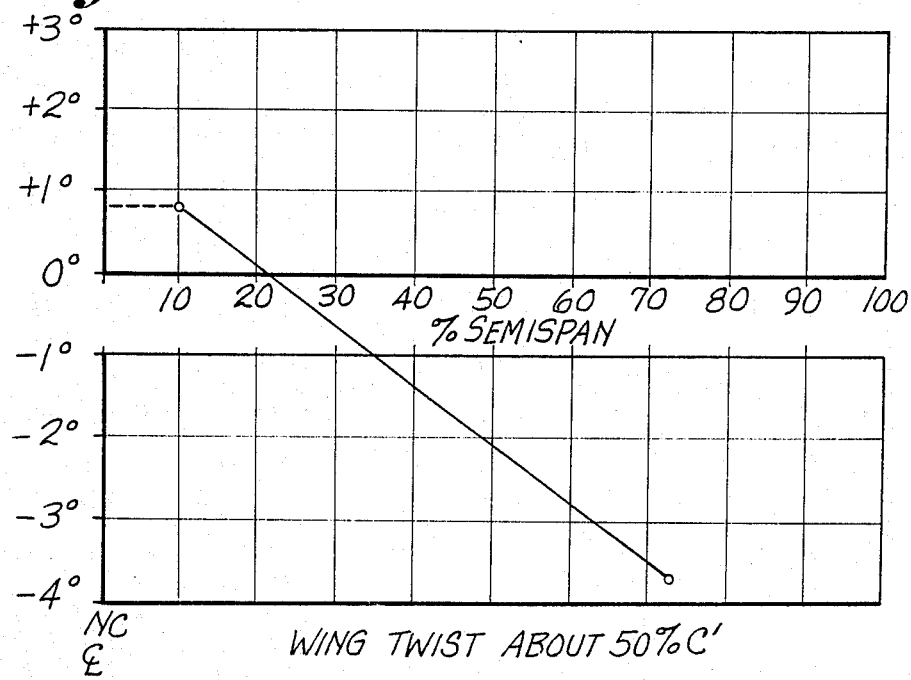
FIG. 12 is a graph of the amount of wing twist in degrees about the fifty percent chord versus the percent of wing semi-span.

FIG. 12 is a graph illustrating the amount of wing twist in degrees about the fifty-percent chord point at various spanwise stations indicated in percent of semi-span. The airfoil section adjacent to the side of the fuselage is at approximately ¾° positive angle of incidence and at 75% semi-span, adjacent to the vertical fin, the airfoil section is at approximately 3 ¾° negative angle of incidence. When the present airplane is at supersonic cruise flight speed of approximately Mach 2.5 and at a cruise altitude of 40,000 feet, the longitudinal axis of the fuselage is at approximately 3.5° positive angle of attack. Therefore, with the wing twist distribution spanwise, as shown in FIG. 12, the wing airfoil sections spanwise will function aerodynically at approximately the same lift coefficient. An untwisted wing of similar planform, using substantially the same designated airfoil section throughout the wing span, will produce different lift coefficients spanwise, because, as the chord length of the airfoil section decreases from wing root to tip and the wing leading edge spanwise airflow and Reynolds number changes, the airflow angle of attack from wing root to tip also decreases and produces different lift coefficients. Therefore, the reason for the wing twist is to make the airfoil section at all of the stations along the span of the wing operate at approximately the same lift coefficient.

While the invention has been disclosed with reference to a certain passenger configuration, it is to be understood that it is readily adaptable to a military fighter, an interceptor, or reconnaissance aircraft and is capable of doing the job of many specialized aircraft configurations. Further, it is to be understood that those modifications and changes which become obvious to a person skilled in the art as a result of the teachings hereof will be encompassed by the following claims.

What is claimed is:

1. A supersonic arrow-shaped main wing airplane, comprising: a fuselage having a forebody section located generally forward of said main wing, a center-body section structurally integrated with said main wing, and an aft-body section extending aft of the trailing edge of said main wing; said forebody section and a portion of said center-body section, having side walls sloping vertically inward in an upward direction such that an upward projection therefrom forms an intersection in an said intersection, in a longitudinal direction, forms a continuous curved loft line to create a body sidewall surface having a single longitudinal curvature; said center-body section having its bottom substantially adjacent to the main wing undersurface such that no fuselage protrusion below the main wing undersurface is evident; two engine nacelles mounted to the undersurface of said main wing, one on either side of the fuselage, with air inlets positioned chordwise aft of the main wing leading edge; two vertical stabilizers, one mounted near each tip of said main wing and extending both vertically above and vertically below the chord plane of said main wing; and an auxiliary wing mounted outboard of said vertical stabilizers and being rotatably movable as a unit about a lateral axis fixed to said main wing, for lateral roll control and/or longitudinal pitch control of the airplane.

2. The supersonic airplane as recited in claim 1, further including: windows located within the area of said vertically inward sloping sidewalls of said forebody section and being of a flat surface for minimum visual distortion due to thermal expansion in supersonic flight.

3. The supersonic airplane as recited in claim 1, wherein: said airplane being area-rule designed and having a plotted area-rule curvilinear line with an average steeper slope in a direction aft of a maximum cross-sectional area point, than in a direction forward of said point; whereby, a decrease in skin friction drag and an increase in supersonic wave drag is produced.

4. The supersonic airplane as recited in claim 1, wherein: said engine nacelles have a forward section externally contoured to a conically divergent section in a fore-to-aft direction and a rearward section externally contoured to a conically convergent section in a fore-to-aft direction.

5. The supersonic airplane as recited in claim 1, wherein: said wing has a major length of its leading edge, from said fuselage outboard to said vertical stabilizers, at approximately seventy-five degrees angle of sweepback.

6. A supersonic arrow-shaped main wing airplane, comprising: a fuselage having a forebody section located generally forward of said main wing, a center-body section structurally integrated with said main wing, and an aft-body section extending aft of the trailing edge of said main wing and having approximately the same length as said forebody section; approximately the forward half of said fuselage having sidewalls sloping vertically inward in an upward direction such that an upward projection therefrom forms an intersection and said intersection, in a longitudinal direction, forms a continuous curved loft line to create a body sidewall surface having a single longitudinal curvature; said arrow-shaped main wing having spar structure passing laterally through the underside of said fuselage and the bottom of said fuselage being substantially adjacent to the main wing undersurface such that no fuselage protrusion below the main wing undersurface is evident; two engine nacelles spaced transversely apart, one on either side of the fuselage and mounted to the undersurface of said main wing, with air inlets positioned chordwise aft of the main wing leading edge; two vertical stabilizers being spaced transversely apart with one positioned outboard of each of said engine nacelles; said two vertical stabilizers being mounted such that each one is near the tip of said main wing and extending both vertically above and vertically below the chord plane of said main wing; and an auxiliary wing mounted outboard of said vertical stabilizers, being in general coplanar alignment with said main wing chord plane and being rotatably movable as a unit about a lateral axis fixed to said main wing, for lateral roll control and/or longitudinal pitch control of the airplane.

7. A supersonic airplane, comprising: a wing being of an arrow shape in top planform and having a straight tapered, continuous span, spar structure; a fuselage having a forebody section located generally forward of said wing, a center-body section structurally integrated with said wing, and an aft-body section extending rearward of the trailing edge of said wing and being of approximately the same length as said forebody section; approximately the forward half of said fuselage being of an egg shape in cross section and having opposite sidewalls sloping vertically inward in an upward direction such that upward projections from said opposite sidewalls form a longitudinal series of intersection points, in a vertical plane above the longitudinal centerline of the fuselage, through which a continuous curved loft line can be drawn; said wing having its spar structure pass laterally through the underside of said fuselage such that the bottom of said fuselage is substantially adjacent to the undersurface of said wing so that protrusion of the fuselage is not evident on the wing undersurface; two engine nacelles spaced transversely apart, one on either side of the fuselage and mounted on the undersurface of said wing, with air inlets positioned chordwise aft of the wing leading edge; a pair of vertical stabilizers of a delta shape in side planform, being spaced transversely apart with one positioned outboard of each of said engine nacelles; said vertical stabilizers being mounted such that each one is near the tip of said wing and extending both vertically above and vertically below the chord plane of said wing for functioning as both directional control means and as wing tip end plates; and wing tip elevons mounted outboard of said vertical stabilizers incoplanar alignment with the chord plane of said wing and being rotatably movable as a unit about a lateral axis for lateral roll control and/or longitudinal pitch control of the airplane.

* * * * *